(12) United States Patent
Jantzon (10) Patent No.: US 11,927,292 B2
(45) Date of Patent: Mar. 12, 2024

(54) DIAPHRAGM RADIAL COMPRESSION RING (DRCRTM) TO ENHANCE THE SEALING ABILITY AND SERVICE LIFE OF THE DIAPHRAGMS USED IN DAMPENERS/ACCUMULATORS/PULSATION CONTROL EQUIPMENT

(71) Applicant: Performance Pulsation Control, Inc., Richardson, TX (US)

(72) Inventor: Cersten Jantzon, Houston, TX (US)

(73) Assignee: Performance Pulsation Control, Inc., Richardson, TX (US)

( * ) Notice: Subject to any disclaimer, the term of this patent is extended or adjusted under 35 U.S.C. 154(b) by 0 days.

(21) Appl. No.: 17/807,347

(22) Filed: Jun. 16, 2022

(65) Prior Publication Data
US 2022/0403969 A1   Dec. 22, 2022

Related U.S. Application Data (60) Provisional application No. 63/202,575, filed on Jun. 16, 2021.

(51) Int. Cl.
*F16L 55/04* (2006.01)
*F16L 55/053* (2006.01)
*F16L 55/055* (2006.01)

(52) U.S. Cl.
CPC .......... *F16L 55/055* (2013.01); *F16L 55/053* (2013.01); *F16L 55/04* (2013.01)

(58) Field of Classification Search
CPC .......... F15B 1/125; F15B 1/106; F15B 1/165; F15B 1/08; F15B 2201/205; F15B 2201/3152; F15B 2201/3156; F15B 2201/435; F16L 55/053

USPC ....................................................... 138/26, 30
See application file for complete search history.

(56) References Cited

U.S. PATENT DOCUMENTS

| 3,232,318 A | | 2/1966 | Jean | |
| 3,654,964 A | * | 4/1972 | Mercier | F16J 13/12 138/30 |
| 3,695,298 A | * | 10/1972 | Zahid | F15B 1/14 138/30 |

(Continued)

FOREIGN PATENT DOCUMENTS

| GB | 553571 A | 5/1943 |
| WO | 2014184389 A1 | 11/2014 |

OTHER PUBLICATIONS

International Search Report and Written Opinion of the International Searching Authority dated Sep. 26, 2022, in connection with International Application No. PCT/US22/33867, 17 pages.

*Primary Examiner* — Patrick F Brinson (57) ABSTRACT

A pulsation dampener includes a body having an internal cavity and an opening providing fluid communication between the internal cavity and a fluid flow external to the body. A flexible diaphragm fitted with the diaphragm radial compression ring is held within the internal cavity, allowing for improved seal ability and enhanced service life of the diaphragm at allowing at least some fluid from the external fluid flow to enter the internal cavity through the opening based on a pressure of the external fluid flow, the flexible diaphragm or elements in contact with the fluid from the external fluid flow that has entered the internal cavity.

14 Claims, 9 Drawing Sheets

(56) References Cited

U.S. PATENT DOCUMENTS

| | | | | |
|---|---|---|---|---|
| 3,907,000 | A | * | 9/1975 | Carr .................. F16L 55/052 |
| | | | | 92/92 |
| 4,162,692 | A | * | 7/1979 | Greer .................. F15B 1/12 |
| | | | | 138/30 |
| 4,177,836 | A | * | 12/1979 | Thompson ............. F15B 1/12 |
| | | | | 220/582 |
| 4,938,463 | A | | 7/1990 | Miyamoto |
| 2004/0045615 | A1 | * | 3/2004 | Rupp .................. F15B 1/106 |
| | | | | 138/30 |
| 2006/0130920 | A1 | * | 6/2006 | Baltes .................. F15B 1/24 |
| | | | | 92/60 |
| 2012/0037253 | A1 | | 2/2012 | Weber |

* cited by examiner

DIAPHRAGM RADIAL COMPRESSION RING (DRCRTM) TO ENHANCE THE SEALING ABILITY AND SERVICE LIFE OF THE DIAPHRAGMS USED IN DAMPENERS/ACCUMULATORS/PULSATION CONTROL EQUIPMENT

CROSS-REFERENCE TO RELATED APPLICATION AND CLAIM OF PRIORITY

This application claims priority to U.S. Provisional Patent Application No. 63/202,575 filed Jun. 16, 2021. The content of the above-identified patent document(s) is incorporated herein by reference.

TECHNICAL FIELD

The present application relates generally to pulsation dampeners/dampners/dampers/accumulators and, more specifically, to enhancing the sealing ability and service life of the diaphragm found within traditional gas-charged or alternatively charged with compressible fluid or compressible elastomers pulsation dampeners.

BACKGROUND

In North America, the first commercial oil well entered operation in Oil Springs, Ontario in 1858, while the first offshore oil well was drilled in 1896 at the Summerland Oil Field on the California coast. Reciprocating systems, such as reciprocating pump systems and similar equipment, operate in many types of cyclic hydraulic applications. For example, reciprocating mud pump systems are used to circulate the mud or drilling fluid on a drilling rig.

As well depths and drilling efficiencies increased along came the need for highly efficient mud pumps. The early designs were rudimentary double acting duplex pumps that have since been replaced with high pressure and high horsepower single acting triplex and other single acting designs including quadruplex, quintuplex and hexuplex mud pumps.

Pressure peaks within the pumped fluid accelerate, with each pulsation, the deterioration of the pump, the pump's fluid end expendable parts, and equipment downstream from the pump, such as measurement equipment used to determine drilling parameters, and wash pipe and wash pipe packing. Failure to control such pressure peaks inevitably affect the operating performance and operational life of the pump, pump fluid end expendable parts and all upstream or downstream components. Pressure peaks may also interfere with instrument signal detection, such that failure to control pressure peaks may also affect the signal detection and/or quality of the signal detection in (for example) measurement while drilling operations.

Thus, with increased pressure and pump horsepower came the need to reduce pulsations from the pump in order to maintain drilling efficiencies. In the early 1940's, nitrogen gas charged pulsation dampeners were introduced beginning with 5, then 10 and now 20 gallon units. As drilling efficiencies are paramount, the need to have pulsation dampeners effectively reduce the level of pulsation energies and their potential interaction with system natural frequencies are becoming more critical. The interaction of the pump primary pulsation frequencies with those of the system sets up potentially harmful and destructive forces (vibrations) resulting in early fatigue failure of mud pump expendables, mud line equipment, Kelly and kicker hoses, top drive wash pipe packing and significant interference with managed pressure drilling (MPD), measurement while drilling (MWD), or logging while drilling (LWD) exploration and production activities.

Pulsation control equipment—e.g., a dampener (or, equivalently for purposes of this disclosure, "damper," "accumulator," or "pulsation control equipment")—is typically placed immediately upstream or downstream from a reciprocating pump, often with a relative size and configuration proportional to the volume of desired fluid displacement per stroke of the pump and the maximum allotted magnitude of the pressure peaks that may be experienced by the pump system during each pulsation. Pulsation control equipment thus aids in reducing pump loads and minimizing pulsation amplitudes to the pump, the pump's fluid end expendable parts and to equipment upstream or downstream. As a result, pulsation control equipment increases the relative operating performance and life of the pump, the pump's fluid end expendable parts and any equipment upstream or downstream from the pump. In addition, drilling efficiency using MPD/MWD/LWD systems is impacted as discussed above.

For gas-charged pulsation dampeners, the additional challenge has always been to establish the correct nitrogen pre-charge on the bladder against expected system operating conditions. In steady-state operating conditions with established pre-charge and charge loss, the system performance and bladder service life degrades. However, in contemporary MPD/MWD/LWD processes, where micro-process corrections are made continuously and system pressures fluctuating widely, the dampener performance and the service life of the bladder is reduced. As pre-charge on the dampener bladder can only be established against zero operating pressure and precharge losses during pump operations, the system needs to be shut down such that productivity is curtailed when making changes to the dampener precharge. Once the calculated pre-charge is established, the bladder may fail when the system pressure varies outside the safe operating limits or may fail to perform as desired when the system pressure varies outside the expected operating range and/or unexpected loss of precharge.

Further, continuous adjustment and loss makeup of the pre-charge needs to be made during the service life of the bladder to ensure long and acceptable performance. A few regenerative systems, as yet highly impractical, have been tried.

In the absence of other solutions, a liquid-only, bladder-less (maintenance free) dampener (e.g., of the type described in Applicant's co-pending U.S. Non-Provisional patent application Ser. No. 17/151,574 filed Jan. 18, 2021, the content of which is incorporated herein by reference) has entered the market, but occupies a large space and/or has a large footprint since the performance (based purely on liquid compressibility) requires a large liquid volume to achieve acceptable pulsation control. The designs are more effective at higher system pressures and may achieve good pulsation control across all applications where system pressures fluctuate beyond what conventional pulsation dampeners are designed to handle, but the space trade-off needs to be considered.

For all bladder-type pulsation dampeners, there has been a continual challenge in maintaining the gas and/or liquid sealing integrity of the bladder.

SUMMARY

A pulsation dampener includes a body having an internal cavity and an opening providing fluid communication between the internal cavity and a fluid flow external to the body. A flexible diaphragm is held within the internal cavity via sealing ledge/lip at least in part by a diaphragm radial compression ring. The flexible diaphragm allows at least some fluid from the external fluid flow to enter the internal cavity through the opening based on a pressure of the external fluid flow. The flexible diaphragm contacts the fluid from the external fluid flow that has entered the internal cavity.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged standpipe manifold dampener or system dampener that can be used to control or partially control pulsation amplitudes.

Employing conventional gas charged dampeners fitted with a diaphragm radial compression ring (e.g., a Diaphragm Radial Compression Ring (DRCR™)), reactive fluid (e.g., RFS™) liquid filled or shaped compressible elastomeric shape filled dampener generally involves a pressure containment vessel in cylindrical, spherical, torospherical or similar shape in which resides a bladder (or, equivalently for purposes of this disclosure, "diaphragm" or "bellows") that contains a nitrogen gas pre-charge, reactive fluid, or compressible elastomeric shapes. These designs have been adapted for use in drilling and all other industrial markets of positive displacement reciprocating piston/plunger pumps.

By adapting the use of the diaphragm radial compression ring increases the sealing efficiency and promotes a longer service life of the bladder. In gas charged applications, a continued small loss of gas charge reduces the dampeners ability to maintain acceptable pulsation control performance and results in diminished service life.

The use of the diaphragm radial compression ring in gas or reactive fluid filled bladder-type dampeners, in combination with a pre-shaped or other elastomeric foam element(s), for pulsation control in accordance with the present disclosure is designed to enhance both the diaphragm sealing ability and service life.

Figure 1:
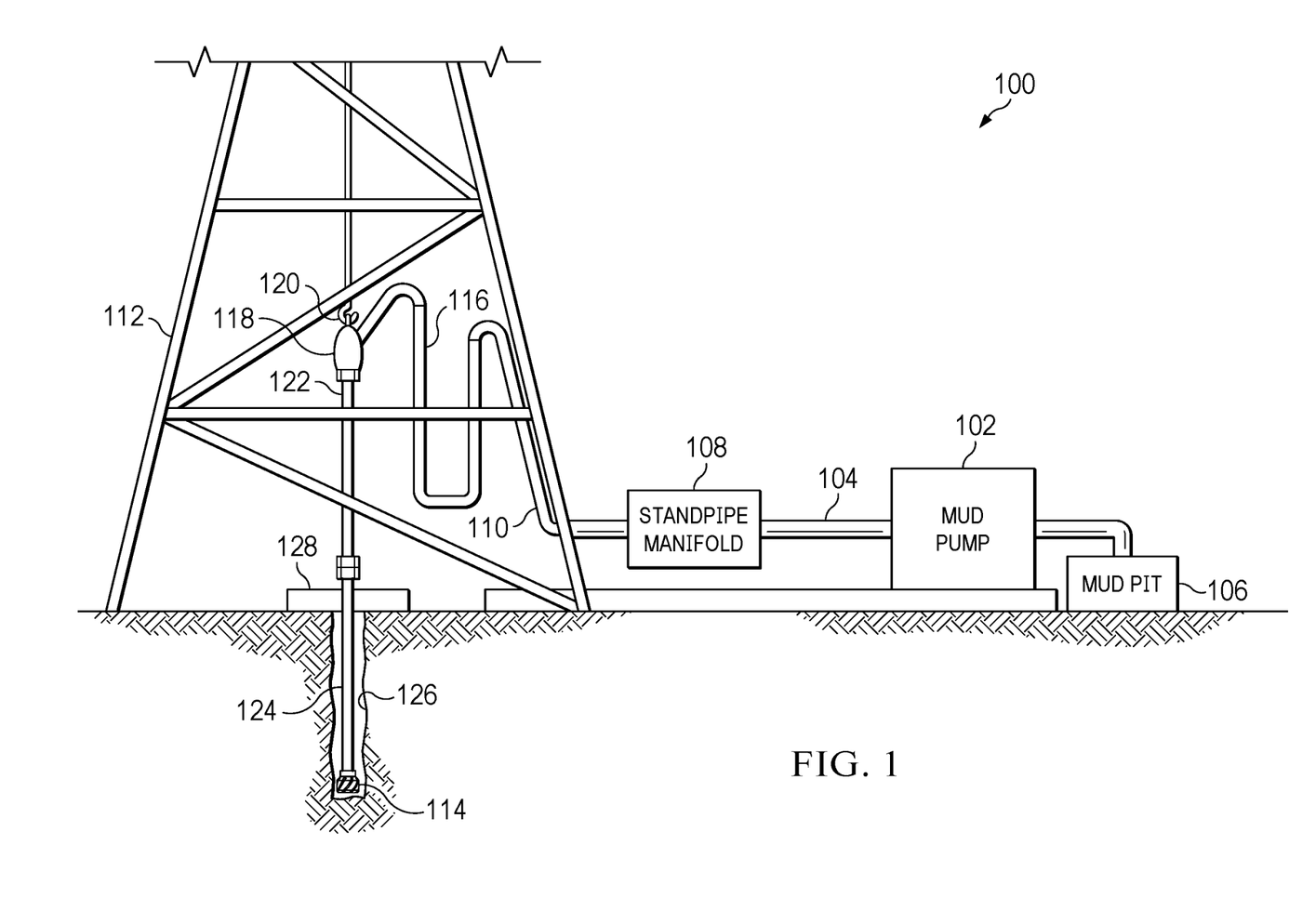
FIG. 1 illustrates a diagrammatic view of a drilling system including a pulsation dampener having a diaphragm fitted with a diaphragm radial compression ring and either pre-charged with nitrogen gas, filled or partially filled with reactive fluid, and/or both, optionally in combination with a pre-shaped or otherwise preformed elastomeric foam element(s), according to various embodiments of the present disclosure.

FIG. 1 illustrates a diagrammatic view of a drilling system including a pulsation dampener a pulsation dampener having a diaphragm fitted with a diaphragm radial compression ring and either pre-charged with nitrogen gas, filled or partially filled with reactive fluid, and/or both, optionally in combination with a pre-shaped or otherwise preformed elastomeric foam element(s), according to various embodiments of the present disclosure. The embodiment of the drilling system 100 illustrated in FIG. 1 is for illustration only. FIG. 1 does not limit the scope of this disclosure to any particular implementation of a drilling or industrial pump system.

Referring now to FIG. 1, the drilling system 100 includes at least one mud pump 102 having a pulsation dampener (not separately depicted) mounted thereon and connected to the pump discharge line 104, and at least one mud pit 106. The drilling system 100 will also normally include at least one standpipe manifold 108, and at least one standpipe 110 mounted within a drilling rig 112. The drilling system 100 operates to pump mud or other fluids down a well currently being drilled to keep a drill bit 114 from overheating, provide lubrication to the drill bit, and remove rock cuttings to the surface.

A fluid pump or mud pump 102 may pump fluid or mud from a mud pit 106 through the discharge line 104 in the direction of a drilling rig 112. (The term "mud pit" may also reference a fluid reservoir, where the fluid reservoir stores a fluid used during a drilling process). More than one mud pump can be utilized in a drilling system 100 to continue drilling upon the failure of a single mud pump. A pulsation dampener can be installed at the discharge line for each mud pump to further reduce pulsations.

Conventionally, a pulsation dampener is located along the discharge line 104, at the outlet of the mud pump 102 and before the standpipe manifold 108. The standpipe manifold 108 may be installed down the discharge line 104 and is attached to and/or coupled in fluid communication with the drilling rig 112. The standpipe manifold 108 may receive a plurality of different fluid streams from a plurality of mud pumps. The standpipe manifold 108 may then combine all of the fluid streams together to send a single fluid stream up the standpipe 110. Other functions traditionally performed by the standpipe manifold are to provide an auxiliary connection for a supplementary pump and, in systems with multiple standpipes providing operational redundancy in case of failure of one standpipe, to switch fluid flow paths from one standpipe to another. However, those skilled in the art understand that some systems dispense with the standpipe manifold, and simply bring the outlet flows of multiple mud pumps together in a single line somewhere near the mud pumps or downstream, with the combined flow then traveling in a single line to the substructure and upwards toward the standpipe, When the fluid streams from multiple mud pumps are combined (in a standpipe manifold or without one), the pulsations in the resulting combined fluid flow can be enlarged based on the different pulsations of the mud pump(s) 102 being used. For example, the different types or sizes of mud pumps can be used in a single drilling system 100, which would cause variations or pulsations in the fluid flow through the pipe. The mud pump(s) 102 could also be located at different distances from the standpipe manifold 108. The mud pump(s) 102 could begin and/or stop operation at different times, with an operating off cycle (phase) distinct from other mud pumps, or simply be operating at different speeds. Any of the previous operating parameters would affect the flow of fluids or mud into the standpipe manifold 108 causing pulsations at the well.

The standpipe 110 may be installed on the drilling rig 112 and travel up the drilling rig 112 to provide the fluid stream through a Kelly hose 116 connected to a swivel 118, the swivel 118 coupled to a rotary hook 120. The standpipe 110 receives discharge from the standpipe manifold, which includes flow from the pump pulsation dampener. The standpipe manifold 108 can include multiple discharges to the standpipe 110 in case of failure in part of the standpipe manifold 108 or associated pipeline The swivel 118 may serve as a passageway for the fluid stream into a Kelly drive 122 (or just "Kelly"). The Kelly 122 connects to a drill string 124. The fluid passes through the Kelly 122 and the drill string 124 down a bore hole 126 to the drill bit 114 disposed at a far end of the drill string 124. The Kelly 122 is typically rotated by a rotary table 128. More recent systems may include a top drive to rotate the drill string 124 as an alternative to the rotary table and Kelly drive, and the present disclosure is applicable to such top drive configurations as well.

Figure 2:
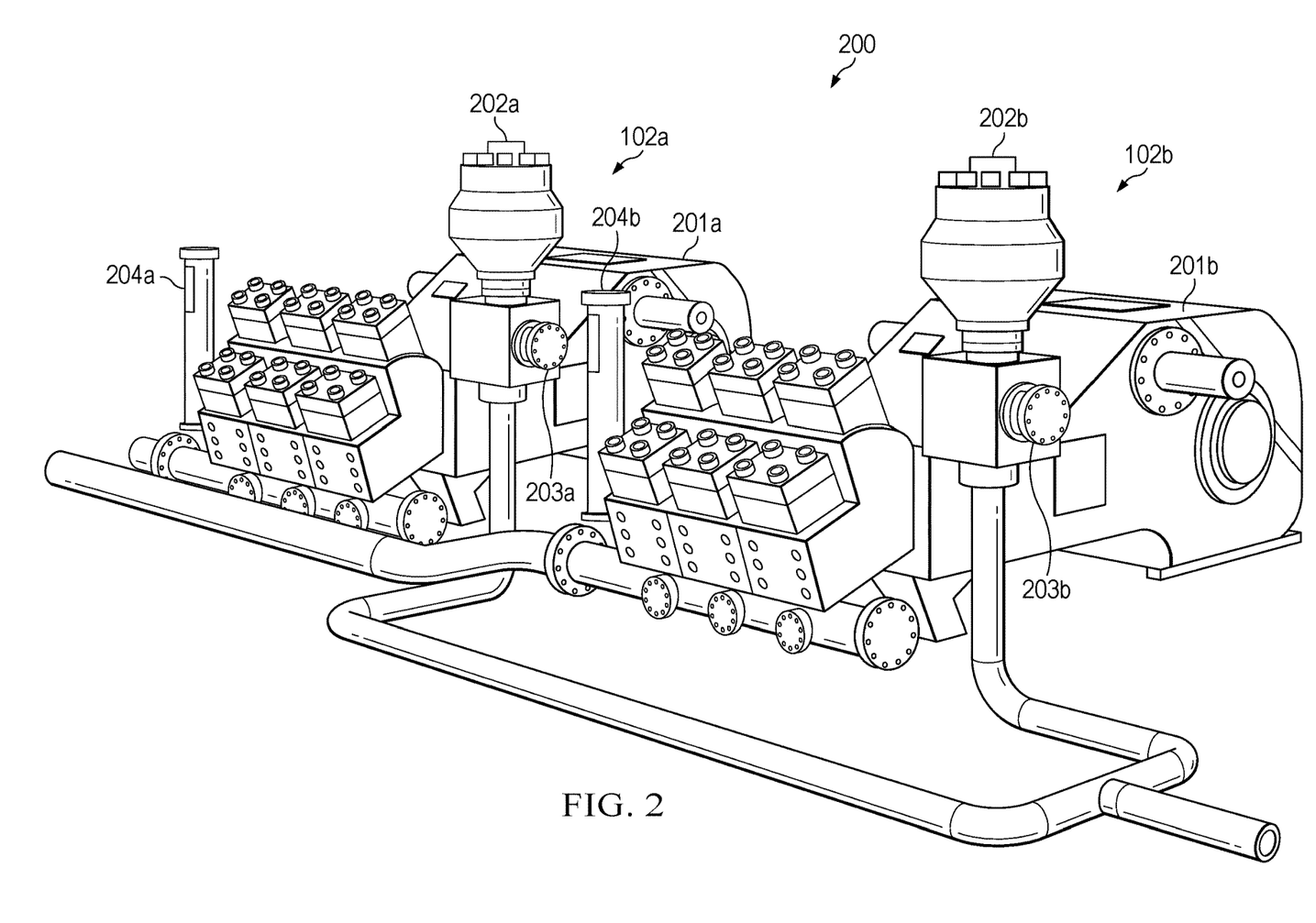
FIG. 2 illustrates a mud pump system pulsation dampener installation for which a pulsation dampener having a diaphragm fitted with a diaphragm radial compression ring and either pre-charged with nitrogen gas, filled or partially filled with reactive fluid, and/or both, optionally in combination with a pre-shaped or otherwise preformed elastomeric foam element(s), in accordance with embodiments of the present disclosure.

A single mud pump 102 is depicted diagrammatically in FIG. 1. However, a drilling system may include multiple mud pumps with interconnected flows as depicted in FIG. 2 and described below. In addition, each mud pump includes a pulsation dampener with a diaphragm filled or partially filled with reactive fluid or reactive fluid infused with nitrogen gas (collectively, a "reactive fluid dampener"), constructed and operating as described in further detail below. Each mud pump may alternatively or additionally include either a hybrid combination of a reactive fluid dampener with a liquid only maintenance free pulsation dampener, or the combined use of cellular components (e.g., cylinders, wedges, or other shapes) with reactive fluid, neither of which is separately shown in FIG. 1.

FIG. 2 illustrates a mud pump system pulsation dampener installation for which a pulsation dampener having a diaphragm fitted with a diaphragm radial compression ring and either pre-charged with nitrogen gas, filled or partially filled with reactive fluid, and/or both, optionally in combination with a pre-shaped or otherwise preformed elastomeric foam element(s), in accordance with embodiments of the present disclosure. The embodiment of the pump system 200 illustrated in FIG. 2 is for illustration only. FIG. 2 does not limit the scope of this disclosure to any particular implementation of a pump system.

In the example illustrated, two three-cylinder pump systems 102a, 102b each include a pump 201a, 201b, an appendage-mounted pulsation dampener 202a, 202b, a strainer cross 203a, 203b (also known as a "discharge strainer" or "cross") partially visible in FIG. 2, and a suction stabilizer 204a, 204b. Pump system 200 may be described as a "multi-pump" system in that the fluid streams from pumps 201a and 201b are combined at some point downstream from at least one of the two pumps to form a single fluid stream within piping, other pumps or functional fluid handling components (e.g., strainer or standpipe manifold), and/or pulsation dampeners, as distinct from pump installations that merely accumulate separate fluid flows from multiple pumps within a storage tank or the like.

Pulsation dampeners 202a, 202b are each mounted on top of a corresponding strainer cross 203a, 203b. Each strainer cross 203a, 203b is connected to the discharge of the respective pump 201a, 201b, to filter solids larger than a predetermined size from the pumped fluid. Suction stabilizers 204a, 204b are connected to the inlet of the respective pump 201a, 201b contribute to the absorption of pressure pulsations.

Each pulsation dampener 202a, 202b contains a flexible, bag-shaped diaphragm (bladder) having a diaphragm fitted with a diaphragm radial compression ring and either pre-charged with nitrogen gas, filled or partially filled with reactive fluid. In some configurations, space and support are key and in/out flow-through piping is required. For use of typically-sized (e.g., 20 gallon) appendage-mounted pulsation dampeners 202a, 202b, pump skids and piping may be of standard design.

Figure 3A:
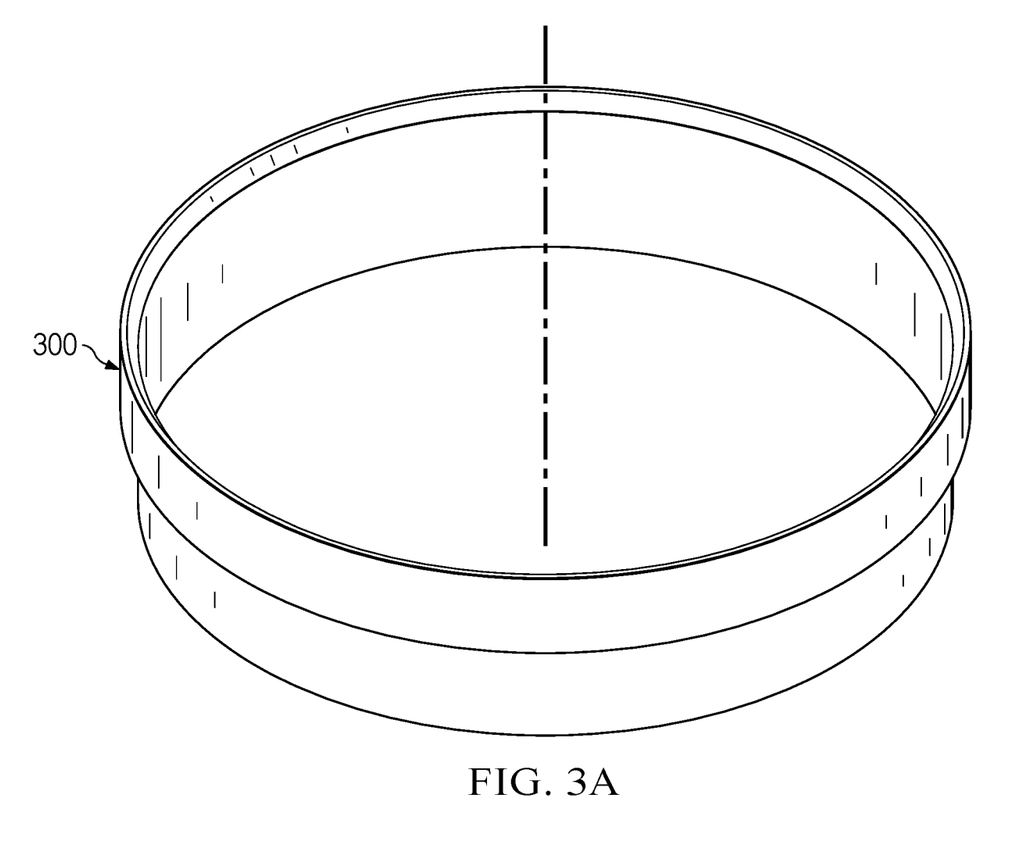
FIGS. 3A through 3C depict a diaphragm radial compression ring for a pulsation dampener having a diaphragm and either pre-charged with nitrogen gas, filled or partially filled with reactive fluid, and/or both, in accordance with embodiments of the present disclosure.
Figure 3B:
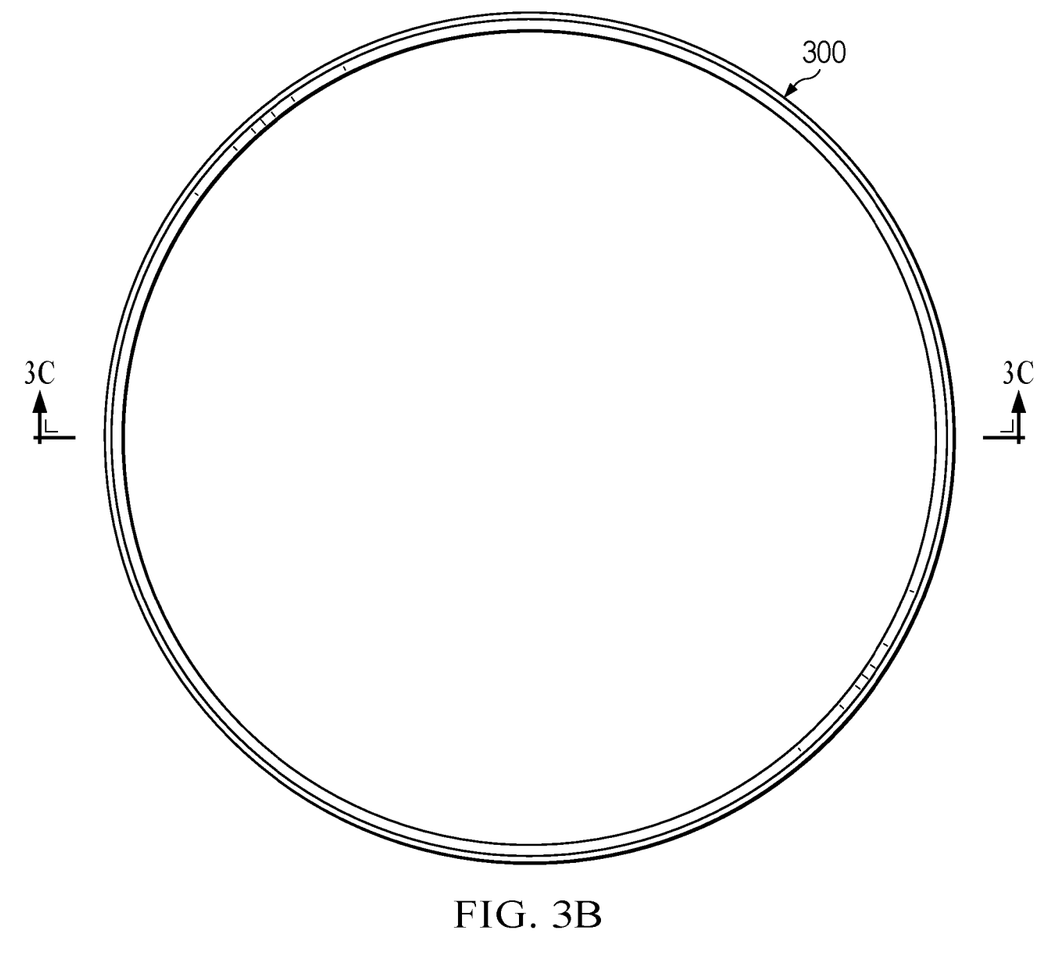
Figure 3C:
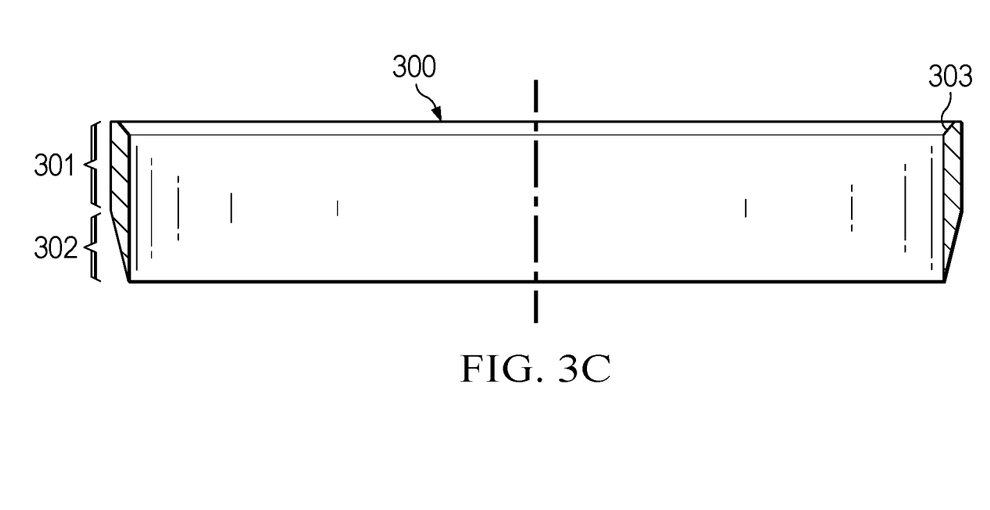

FIGS. 3A through 3C depict a diaphragm radial compression ring for a pulsation dampener having a diaphragm and either pre-charged with nitrogen gas, filled or partially filled with reactive fluid, and/or both, in accordance with embodiments of the present disclosure. The embodiment of the diaphragm radial compression ring 300 illustrated in FIGS. 3A-3C is for illustration only. FIGS. 3A-3C does not limit the scope of this disclosure to any particular implementation.

FIG. 3A is a perspective view and FIG. 3B is a top plan view of the diaphragm radial compression ring 300, while FIG. 3C is a sectional view taken at section lines A-A. In the example shown, the diaphragm radial compression ring 300 is an annular cylinder with an upper portion 301 having uniform thickness and a lower portion 302 that is tapered, and has a beveled upper inner edge 303. The diaphragm radial compression ring 300 is for use in a conventional 20 gallon gas pre-charged, or reactive fluid filled or other gas-less system, in order to enhance the gas or liquid sealing efficiency and increase in bladder service life. The primary focus of the diaphragm radial compression ring 300 is for use with diaphragms filled or partially filled with reactive fluid (or, for most applications contemplated herein, a hybrid combination of liquids including reactive fluid that may be used interchangeably with reactive fluid liquid), in combination with a pre-shaped or other elastomeric foam element(s) within maintenance free pulsation dampeners. The diaphragm radial compression ring 300 is designed to ensure a significant improvement on gas and/or liquid seal ability, service life of the bladder, increased MPD drilling efficiencies and both MWD/LWD signal response as and when needed during drilling operations. The bladder fitted with the diaphragm radial compression ring 300 and filled or partially filled with reactive fluid in combination with pre-shaped or otherwise formed elastomeric foam element(s) essentially allows the driller to continue their mode of operation and gain higher drilling efficiencies in extended reach drilling programs without the need to precharge/recharge the conventional drilling dampener.

Figure 4A:
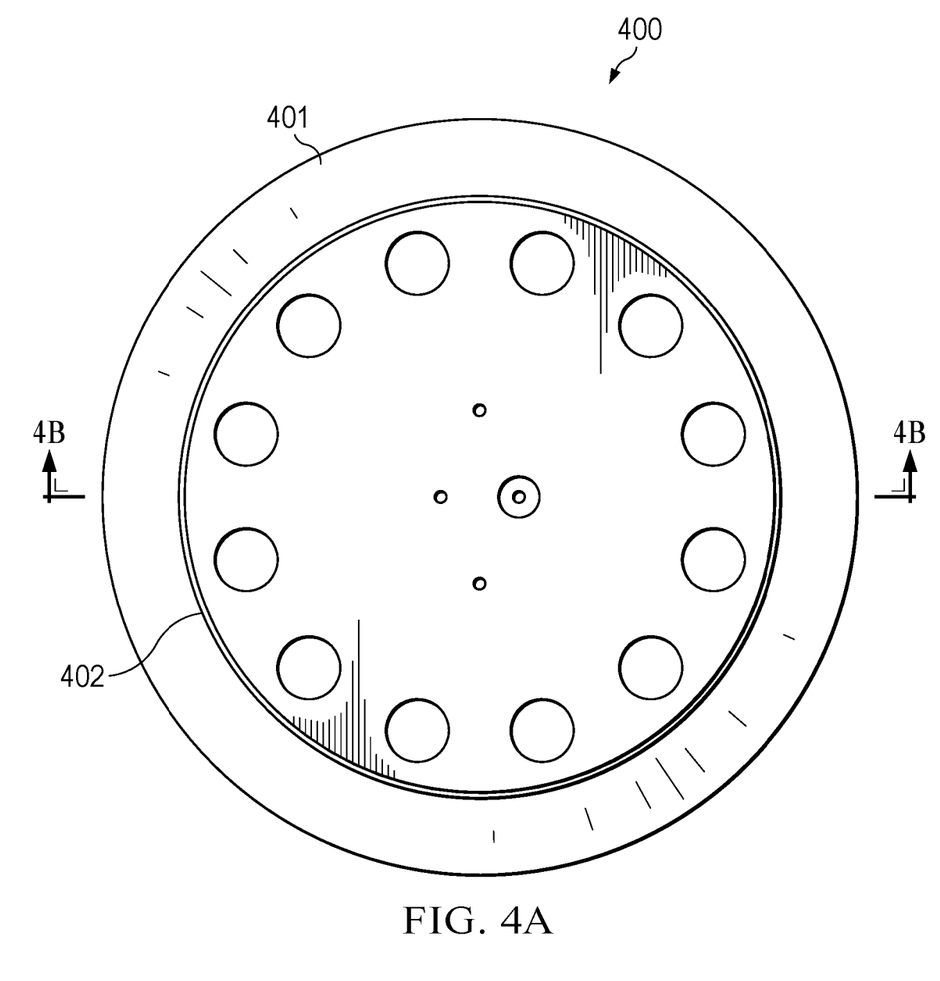
FIGS. 4A through 4C depict portions of a pulsation dampener having a diaphragm radial compression ring for a diaphragm in accordance with embodiments of the present disclosure.
Figure 4B:
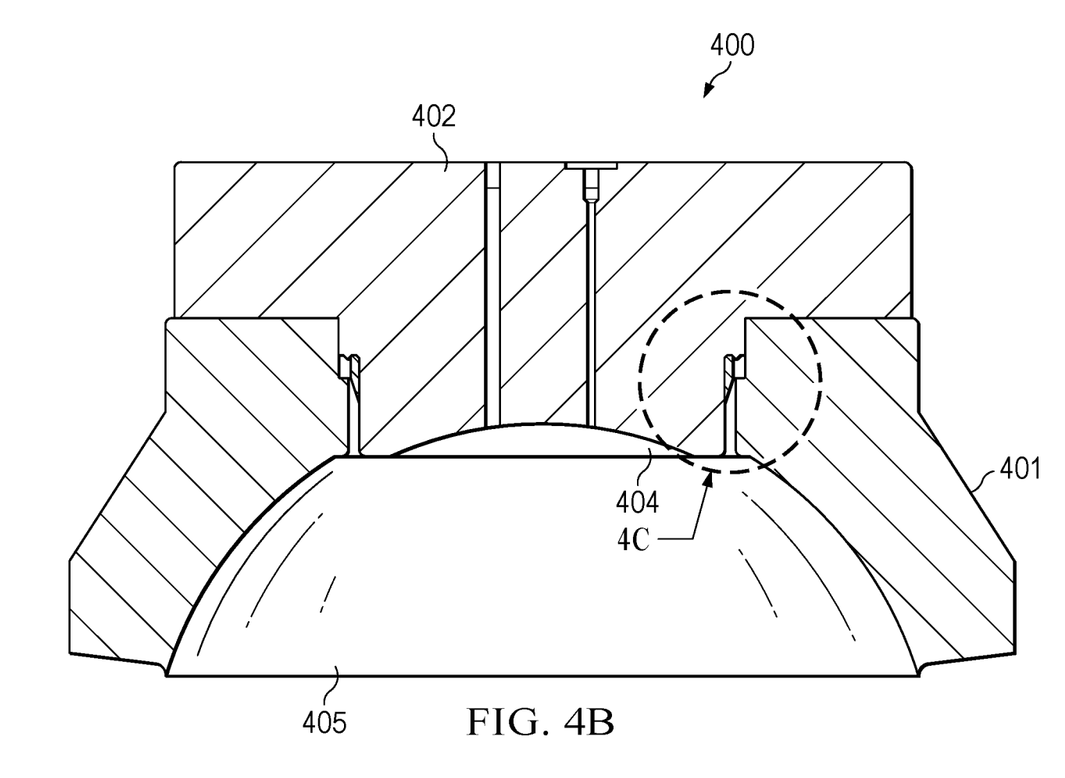
Figure 4C:
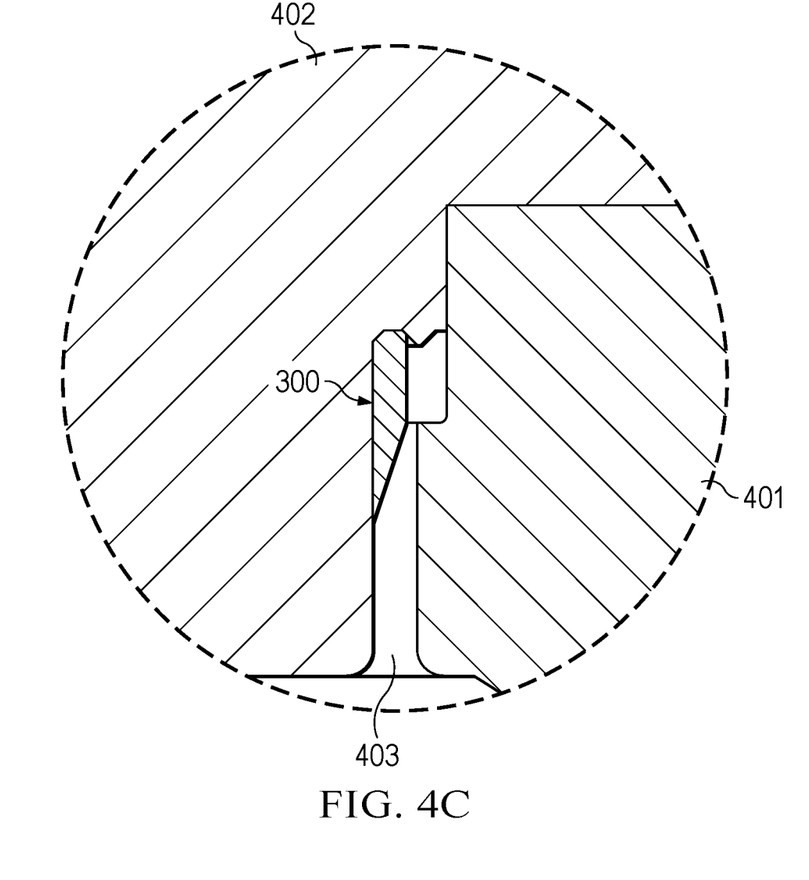

FIGS. 4A through 4C depict portions of a pulsation dampener having a diaphragm radial compression ring for a diaphragm, and either pre-charged with nitrogen gas, filled or partially filled with reactive fluid, and/or both, in accordance with embodiments of the present disclosure. The embodiment of the pulsation dampener 400 illustrated in FIGS. 4A-4C is for illustration only. FIGS. 4A-4C does not limit the scope of this disclosure to any particular implementation. The illustrated diaphragm radial compression ring, when installed, enhances the diaphragm sealing mechanism (gas and/or liquid and drilling fluids) to achieve substantially more leak-free operation and longer service life.

FIG. 4A is a plan view and FIG. 4B is a partial sectional view taken at section lines A-A of the pulsation dampener 400 including a diaphragm radial compression ring 300, while FIG. 4C is a detail of a portion of FIG. 4B. The dampener 400 is fitted with the diaphragm radial compression ring 300 according to embodiments of the present disclosure. As depicted, the pulsation dampener 400 includes a body 401 having an upper opening receiving and sealed by a cover plate 402 and fitted with the diaphragm radial compression ring 300. As shown, the cover plate 402 is bolted to the body 401 using perimeter studs and nuts, with a portion 403 (a "rim" or "seal area") of the bladder or diaphragm 405 acting as the sealing mechanism sealing the internal cavity 404 and with additional sealing force provided by the diaphragm radial compression ring 300. The bladder or diaphragm 405 is flexible and bag-shaped and is fitted with diaphragm radial compression ring 300, and is disposed within the internal cavity 404 of the body 401. The bladder or diaphragm is filled with one or more of nitrogen gas, reactive fluid, or reactive fluid in combination with a pre-shaped or other elastomeric foam element(s). In the example shown, a portion 403 of the diaphragm 405 and diaphragm radial compression ring 300 seal the interface between the body 401 and the cover plate 402.

Fluid from the connected piping enters and/or leaves the dampener 400 via a lower opening (not shown) in the body 401. The pressure of that fluid relative to the pressure of the nitrogen gas precharge, reactive fluid, or reactive fluid in combination with pre-shaped or other foam element(s) within the diaphragm 405 will cause the lower surface of the diaphragm 405, which is in contact with the pumped system fluid, to shift such that the volume within the cavity 404 that is occupied by the bladder or diaphragm 405 changes.

The pulsation dampener 400 may optionally include a guard covering a high pressure fill valve for receiving nitrogen gas or liquid reactive fluid during initial fill or replenishment and a pressure gauge to indicate reactive fluid pressure during pump operation. A diaphragm stabilizer in the form of a semi-rigid or compressible plate (for example, elastomeric foam) may or may not be attached to the bottom of the diaphragm to help reinforce and maintain the shape of the diaphragm across repetitive cycles of pressure pulsation dampening.

Within pump system 200, pulsation dampener 400 may be used for either or both of pulsation dampeners 202a, 202b, either or both of which may be fitted with the diaphragm radial compression ring 300 and may be mounted on a strainer-cross at the outlet of the respective pump 201a, 201b as described above connection with FIG. 2.

As discussed above, the diaphragm 405 that includes rim portion 403 may be fitted with the diaphragm radial compression ring 300. The diaphragm 405 may be formed of standard material and have a conventional or unconventional shape, is filled with one or more of nitrogen gas, reactive fluid, and/or reactive fluid in combination with elastomeric shapes, compressible elastomeric disks, or other compressible element(s). The elastomeric shapes are a compressible foam or foam like material, such as a closed cell foam.

Figure 5A:
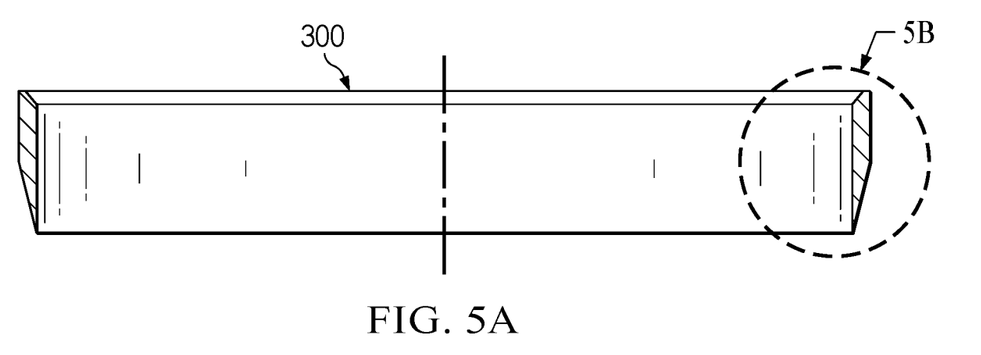
FIGS. 5A and 5B are additional views of the diaphragm radial compression ring depicted by FIGS. 3A through 3C.
Figure 5B:
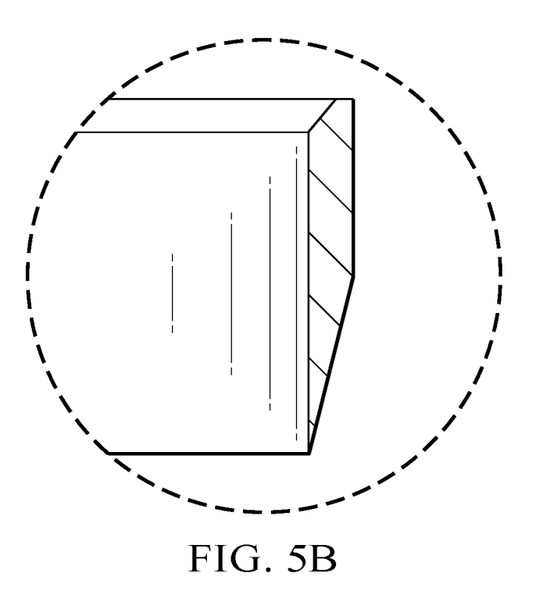

FIGS. 5A and 5B are additional views of the diaphragm radial compression ring depicted by FIGS. 3A-3C.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A pulsation dampener, comprising:
   a body having an internal cavity and a first opening and a second opening;
   a cover plate configured to close the first opening, wherein the second opening provides fluid communication between the internal cavity and a fluid flow external to the body;
   a flexible diaphragm held by a seal area, in compression between the body and the cover plate, the flexible diaphragm configured to allow at least a portion of fluid from the external fluid flow to enter the internal cavity through the second opening when a pressure of the external fluid flow exceeds a pressure in the flexible diaphragm, wherein at least a portion of the flexible diaphragm contacts the portion of fluid from the external fluid flow that has entered the internal cavity; and
   a diaphragm radial compression ring fitted to the seal area of the flexible diaphragm,
   wherein the diaphragm radial compression ring comprises an annular cylinder with an upper portion having uniform thickness and a lower portion that is tapered, and
   wherein the diaphragm radial compression ring has a beveled upper inner edge.

2. The pulsation dampener according to claim 1, wherein the diaphragm radial compression ring is configured to reinforce the flexible diaphragm and help maintain a shape of the flexible diaphragm across repetitive cycles of pressure pulsation dampening.

3. The pulsation dampener according to claim 1, wherein the diaphragm radial compression ring is configured to provide additional sealing force in sealing the internal cavity by compression between the cover plate and the body.

4. The pulsation dampener according to claim 1, wherein the diaphragm radial compression ring improves a seal ability and a service life of the flexible diaphragm.

5. The pulsation dampener according to claim 1, wherein the diaphragm radial compression ring is adaptable for dampener diaphragms with openings to allow filling of the pulsation dampener with one or more of nitrogen gas precharge, reactive fluid, or reactive fluid in combination with compressible elastomeric shapes.

6. The pulsation dampener according to claim 1, wherein the diaphragm radial compression ring is adaptable for dampeners utilizing only compressible elastomeric shapes.

7. A pulsation dampener, comprising:
- a body having a first opening and a second opening, wherein the second opening is configured to provide fluid communication between an internal cavity of the body and a fluid flow external to the body;
- a cover plate configured to close the first opening;
- a flexible diaphragm held between the body and the cover plate by a seal area of the flexible diaphragm, the flexible diaphragm filled with a compressible material configured to dampen pressure pulsations within the fluid flow by allowing a portion of the fluid flow to enter the internal cavity through the second opening when a pressure of the fluid flow compresses the compressible material; and
- a diaphragm radial compression ring fitted to the seal area of the flexible diaphragm
- wherein the diaphragm radial compression ring comprises an annular cylinder with an upper portion having uniform thickness and a lower portion that is tapered, and
- wherein the diaphragm radial compression ring has a beveled upper inner edge.

8. The pulsation dampener according to claim 7, wherein the diaphragm radial compression ring is configured to reinforce the seal area of the flexible diaphragm and help maintain a shape of the flexible diaphragm across repetitive cycles of pressure pulsation dampening.

9. The pulsation dampener according to claim 7, wherein the diaphragm radial compression ring is configured to provide additional sealing force in sealing the internal cavity by compression between the cover plate and the body.

10. The pulsation dampener according to claim 7, wherein the diaphragm radial compression ring improves a seal ability and a service life of the flexible diaphragm.

11. The pulsation dampener according to claim 7, wherein the diaphragm radial compression ring is adaptable for dampener diaphragms with openings to allow filling of the pulsation dampener with one or more of nitrogen gas precharge, reactive fluid, or reactive fluid in combination with compressible elastomeric shapes.

12. The pulsation dampener according to claim 7, wherein the diaphragm radial compression ring is adaptable for dampeners utilizing only compressible elastomeric shapes.

13. A method of improving sealing for a pulsation dampener including a body having an internal cavity and a first opening and a second opening, wherein the second opening providing fluid communication between the internal cavity of the body and a fluid flow external to the body, a cover plate closing the first opening, and a flexible diaphragm held between the body and the cover plate by a seal area of the flexible diaphragm, the flexible diaphragm filled with a compressible material configured to dampen pressure pulsations within the fluid flow by allowing a portion of the fluid flow to enter the internal cavity through the second opening when a pressure of the fluid flow compresses the compressible material, the method comprising; and

- fitting a diaphragm radial compression ring to the seal area of the flexible diaphragm, between the body and the cover plate, to increase a sealing force sealing the internal cavity by compression of the seal area of the flexible diaphragm between the cover plate and the body
- wherein the diaphragm radial compression ring comprises an annular cylinder with an upper portion having uniform thickness and a lower portion that is tapered, and
- wherein the diaphragm radial compression ring has a beveled upper inner edge.

14. The method according to claim 13, wherein the diaphragm radial compression ring reinforces the seal area of the flexible diaphragm and helps maintain a shape of the flexible diaphragm across repetitive cycles of pressure pulsation dampening.

* * * * *